US010117095B2

(12) United States Patent
Channabasappa et al.

(10) Patent No.: US 10,117,095 B2
(45) Date of Patent: Oct. 30, 2018

(54) QUANTIFIED IDENTITY

(71) Applicant: Cable Television Laboratories, Inc., Louisville, CO (US)

(72) Inventors: Sumanth Channabasappa, Broomfield, CO (US); Oscar G. Marcia, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 15/369,697

(22) Filed: Dec. 5, 2016

(65) Prior Publication Data

US 2017/0086074 A1 Mar. 23, 2017

Related U.S. Application Data

(63) Continuation of application No. 14/291,035, filed on May 30, 2014, now Pat. No. 9,514,295.

(51) Int. Cl.
| | |
|---|---|
| *H04L 29/00* | (2006.01) |
| *H04W 12/06* | (2009.01) |
| *G06F 21/33* | (2013.01) |
| *G06F 21/31* | (2013.01) |
| *G06F 21/34* | (2013.01) |
| *G06F 21/35* | (2013.01) |
| *G06F 21/36* | (2013.01) |
| *G06Q 10/00* | (2012.01) |
| *G06Q 20/20* | (2012.01) |
| *G06Q 20/40* | (2012.01) |
| *H04L 29/06* | (2006.01) |

(52) U.S. Cl.
CPC ............ *H04W 12/06* (2013.01); *G06F 21/31* (2013.01); *G06F 21/33* (2013.01); *G06F 21/34* (2013.01); *G06F 21/35* (2013.01); *G06F 21/36* (2013.01); *G06Q 10/00* (2013.01); *G06Q 20/206* (2013.01); *G06Q 20/4014* (2013.01); *H04L 63/083* (2013.01); *H04L 63/0853* (2013.01); *H04L 63/0861* (2013.01)

(58) Field of Classification Search
CPC ............ H04L 9/32; H04L 29/00; G06F 21/00
USPC .......................................................... 726/19
See application file for complete search history.

(56) References Cited

U.S. PATENT DOCUMENTS

| | | | |
|---|---|---|---|
| 8,707,458 B2 | 4/2014 | Malaney | |
| 2012/0144201 A1* | 6/2012 | Anantha | ............... H04L 9/0897 713/172 |
| 2014/0139315 A1* | 5/2014 | Keranen | ............. H04L 63/0492 340/5.51 |

* cited by examiner

*Primary Examiner* — Anthony Brown
*Assistant Examiner* — Michael D Anderson
(74) *Attorney, Agent, or Firm* — Great Lakes Intellectual Property, PLLC

(57) ABSTRACT

Determination of a quantified identity using a multi-dimensional, probabilistic identity profiles is contemplated. The quantified identity may be used to authenticate a user entity provided to a point-of-sale device or other interface associated with identity requester in order to verify the corresponding users as who they say they are. The user identity may be determined initially as a function of user inputs made to the identity requester and/or as a function of wireless signaling exchange with devices associated with the user.

20 Claims, 10 Drawing Sheets

| Element | Authentication & Verification | Location | Proximity to other Elements |
|---|---|---|---|
| Cellphone | +0.1: authenticated | +0.1: as expected | +0.1: close to all |
|  | -1: unverifiable or unexpected | -0.1: unverifiable | 0: unverifiable |
|  |  | -1: unverifiable or unexpected | -1: one or more is not close enough |
| Presence of On-body device (e.g., smart pedometer) | +0.1: authenticated | +0.1: as expected | +0.1: verified on-body |
|  | -1: unverifiable or unexpected | 0: incapable | 0: unverifiable |
|  |  | -1: unexpected | -1: unexpected |
| Smart keys (e.g., automobile) | +0.1: authenticated | +0.1: as expected | +0.1: verified on-body |
|  | -1: unverifiable or unexpected | 0: incapable | 0: unverifiable |
|  |  | -1: unexpected | -1: unexpected |
| In-Body smart product (e.g., insulin pump) | +0.1: authenticated | +0.1: as expected | +0.1: verified in-body |
|  | -1: unverifiable or unexpected | 0: incapable | 0: unverifiable |
|  |  | -1: unexpected | -1: unexpected |

Fig. 7

QUANTIFIED IDENTITY

CROSS-REFERENCE TO RELATED APPLICATIONS

This application is a continuation of U.S. application Ser. No. 14/291,035 filed May 30, 2014, the disclosure and benefit of which is hereby incorporated in its entirety by reference herein.

TECHNICAL FIELD

The present invention relates to determining a quantified identity as a function of a user identity or other user identifying characteristics requiring additional verification mode about the user, such as to provide identity authentication to an identity requestor according to a multi-dimensional, probabilistic identity profile.

BACKGROUND

The identity and authentication needs of today rely on either physical entities that you "own or rent" (e.g., set-top box, cable modem, credit card, mobile phone), what you "know" (e.g., username & password), or both (e.g., as one form of two-factor authentication). For instance, people can use their cable account to access HBO content on their tablet or their Amazon account to make a pledge on Kickstarter. Some identity and authentication needs are starting to explore facial recognition, retinal scans and voice recognition—either as independent mechanisms. Current mechanisms require users to either be near these authorized entities (e.g., at home for a cable box), or "remember" certain information (e.g., passwords). Alternative mechanisms are not always secure, e.g., voice recognition is weak, unless you add additional monitoring and facial recognition opens up privacy concerns.

BRIEF DESCRIPTION OF THE DRAWINGS

FIG. 7 illustrates QI data calculation tables in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One non-limiting aspect of the present invention describes how a Quantified Identity idea may be realized. It starts by describing the logical entities that may be utilized for this invention, followed by the relationships to be established and the message flow during a runtime transaction illustrated as a flow chart with a sample use case and a high-level architectural view and the associated algorithms to bring this idea to fruition.

Figure 1:
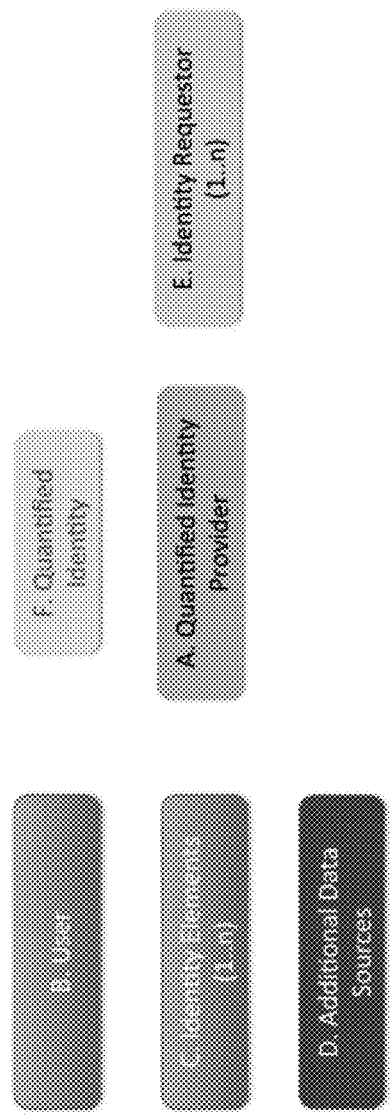
FIG. 1 illustrates a quantified identity system in accordance with one non-limiting aspect of the present invention.
Figure 2:
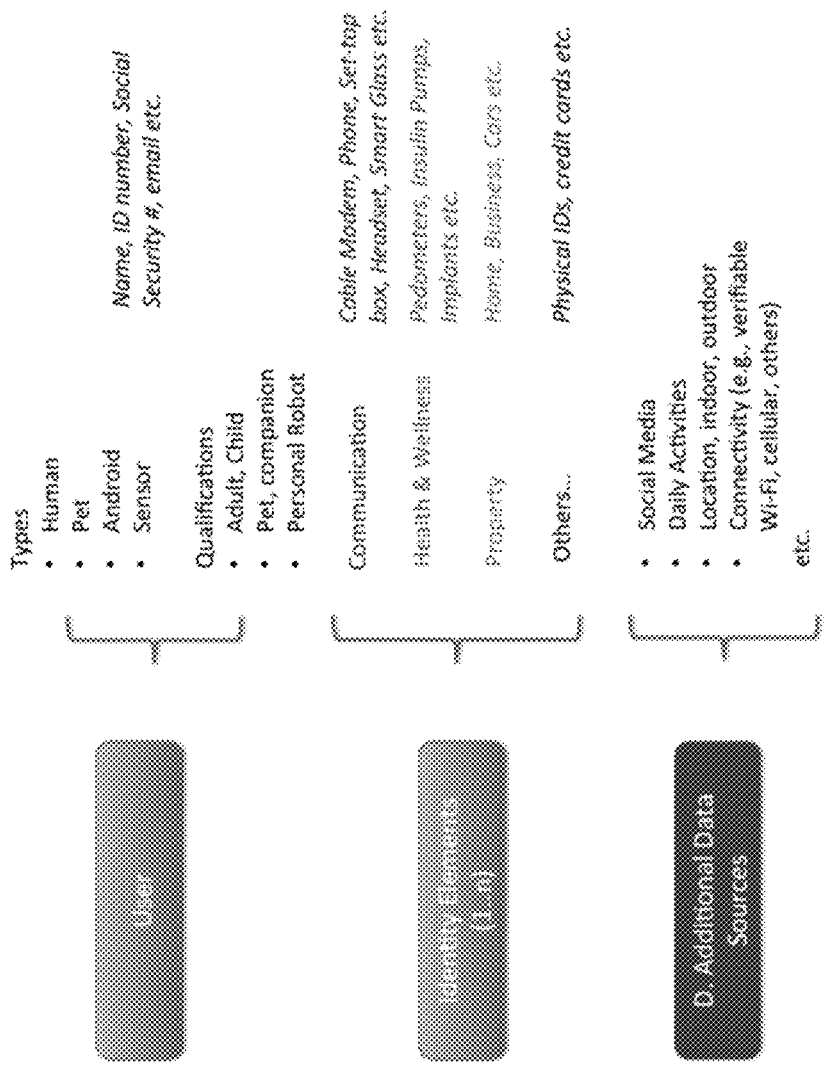
FIG. 2 illustrates a non-exhaustive description of associations in accordance with one non-limiting aspect of the present invention.

FIG. 1 and FIG. 2 list the logical entities of interest, and a brief description of a subset of the elements, respectively.

A. Quantified Identity Provider (QIP)

This is the service provider who can provide a quantified identity for a given user, based on communication with the associated identity elements and any additional data sources. Similar to identity providers (e.g., single sign-on providers), there may be more than one quantified identity provider in the market.

B. User

This is the entity whose Quantified Identity is provided by the QIP. This can refer to humans, pets, androids, or anything that needs an identity. It can also be qualified into sets, such as adult or child. See additional examples in FIG. 2.

C. Identity Elements

These are the elements that can help identify the User. As shown in FIG. 2, this can be a wide variety of communication, health or other devices. One requirement may be for these devices to be able to communicate with each other, and for at least one of them to be able to communicate with the QIP (the Primary ID Element). When you have a collection of such elements, it is referred to as an "Identity Element Set".

D. Additional Data Sources

In addition to the identity element set, the QIP may rely on outside sources. For instance, social media indicators, personal location history, travel history etc. to refine the 01 appropriately. For instance, to flag cases where the user has a lower probability of being there, even though there are sufficient identity elements to suggest otherwise.

E. Identity Requestor

This is anyone who needs the Quantified Identity. This could be a merchant, whose establishment (or website) that the user wishes to make a purchase from. It can also be a business that is attempting to allow (or disallow) the user.

F. Quantified Identity (QI)

The QME determine the quantified identity of a user at a given point in space and time. The QI may be a probabilistic indicator, whose value depends on the likelihood of the user being the entity he/she/it claims to be, based on the identity element set and any additional data sources.

Figure 3:
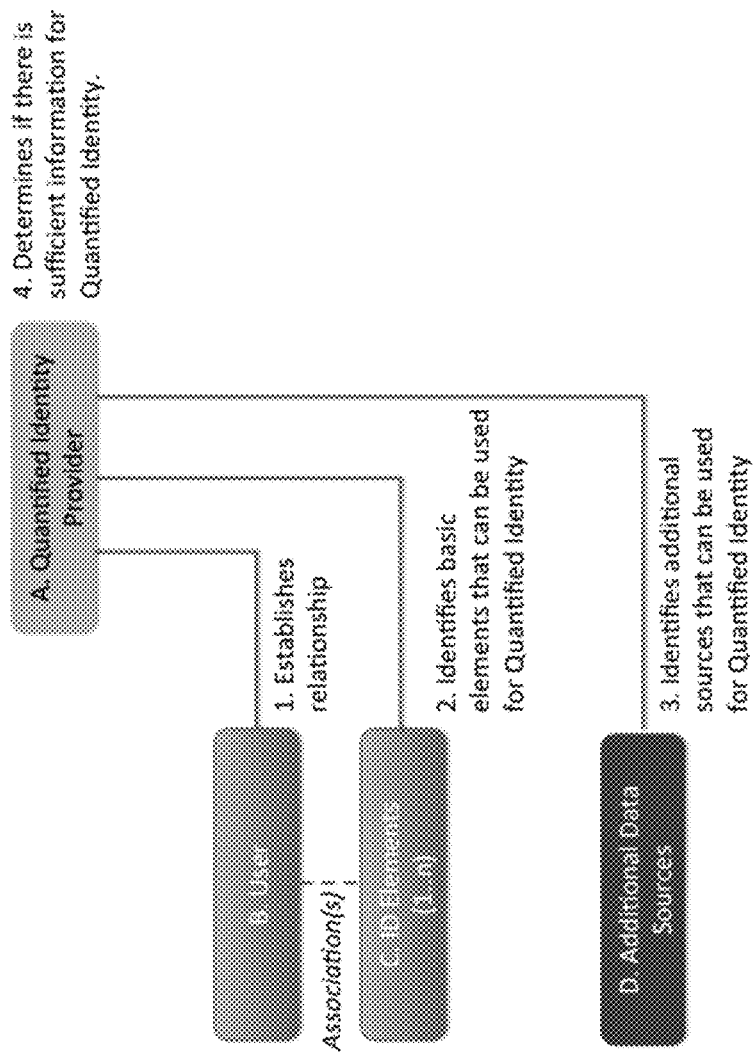
FIG. 3 illustrates establishment of quantified identity service in accordance with one non-limiting aspect the present invention.
Figure 4:
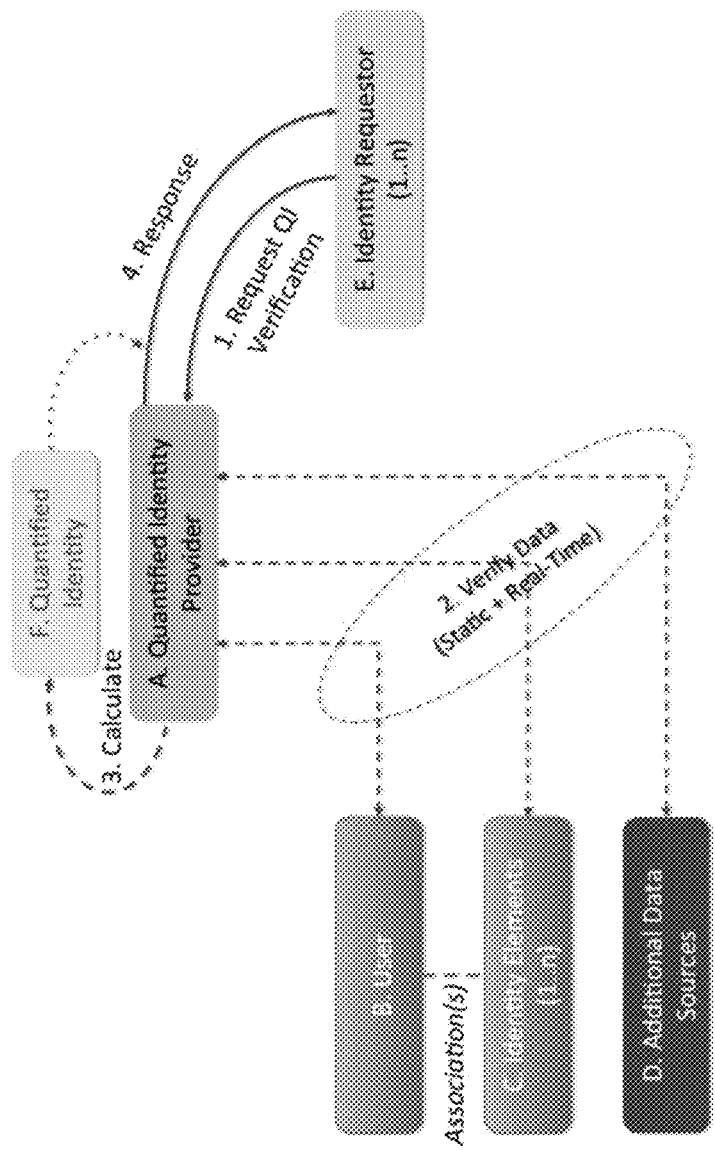
FIG. 4 illustrates a run time transaction in accordance with one non-limiting aspect of the present invention.
Figure 5:
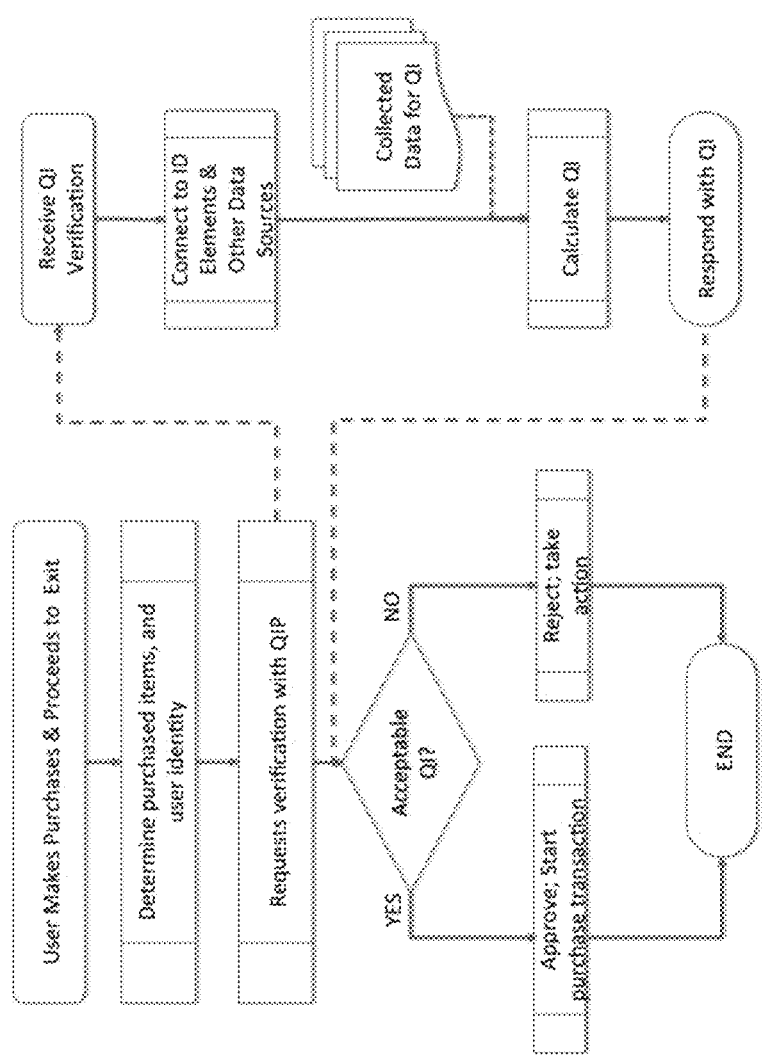
FIG. 5 illustrates a store purchase through a point-of-sale device in accordance with one non-limiting aspect of the present invention.

FIG. 3 shows the basic setup, where the QIP establishes a relationship with the user, and determines if there are enough identity elements for a QI. Once established, a simplified request and response message flow is shown in FIG. 4. This message flow is shown with some additional detail in FIG. 5.

Figure 6:
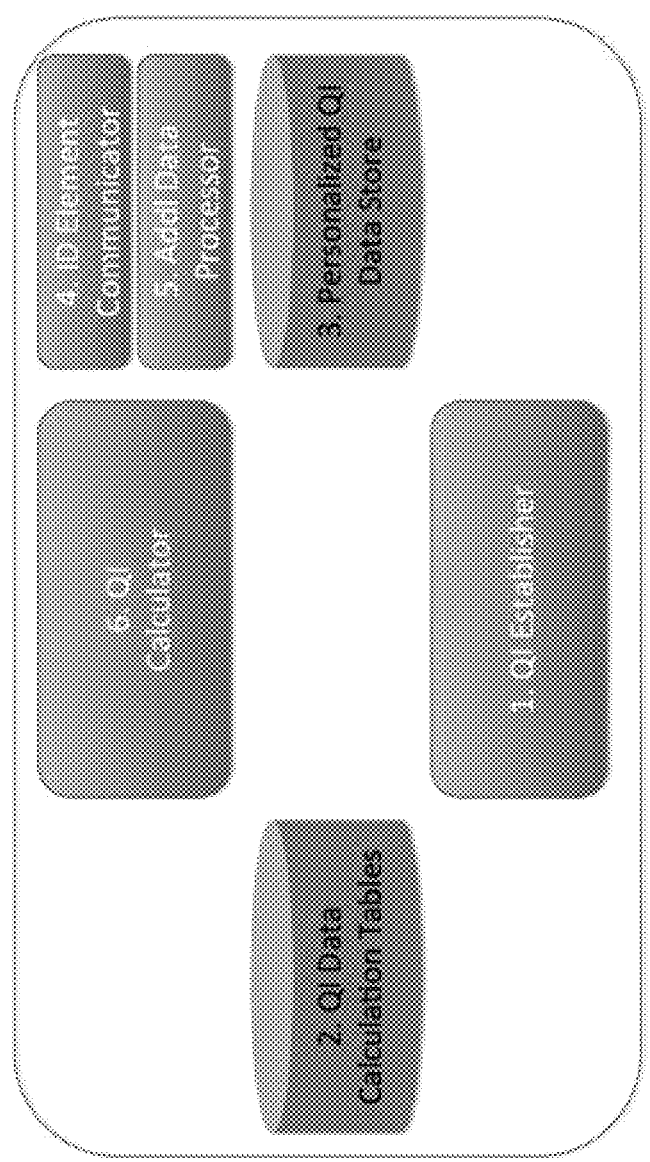
FIG. 6 illustrates a quantified identity provider logical architectural elements in accordance with one non-limiting aspect of the present invention.
Figure 8:
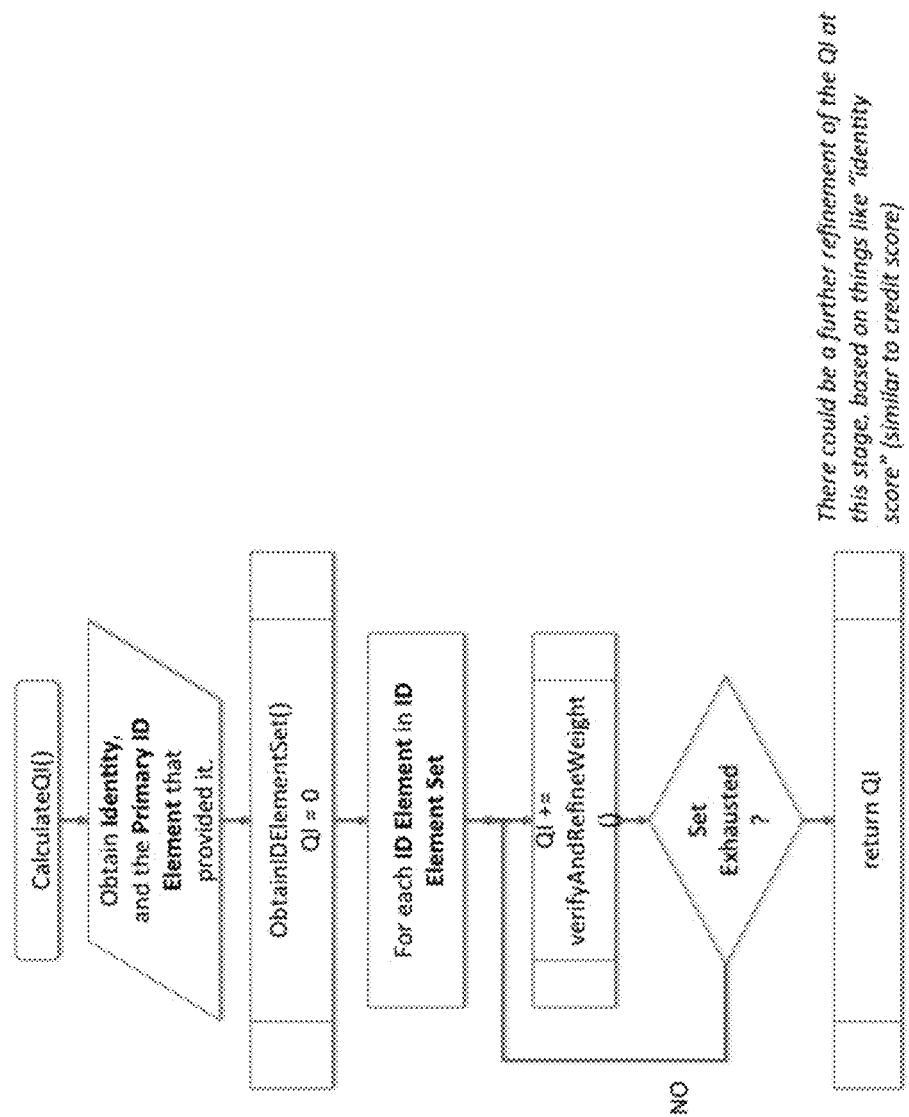
FIG. 8 illustrates a QI calculation algorithm in accordance with one non-limiting aspect of the present invention.
Figure 9:
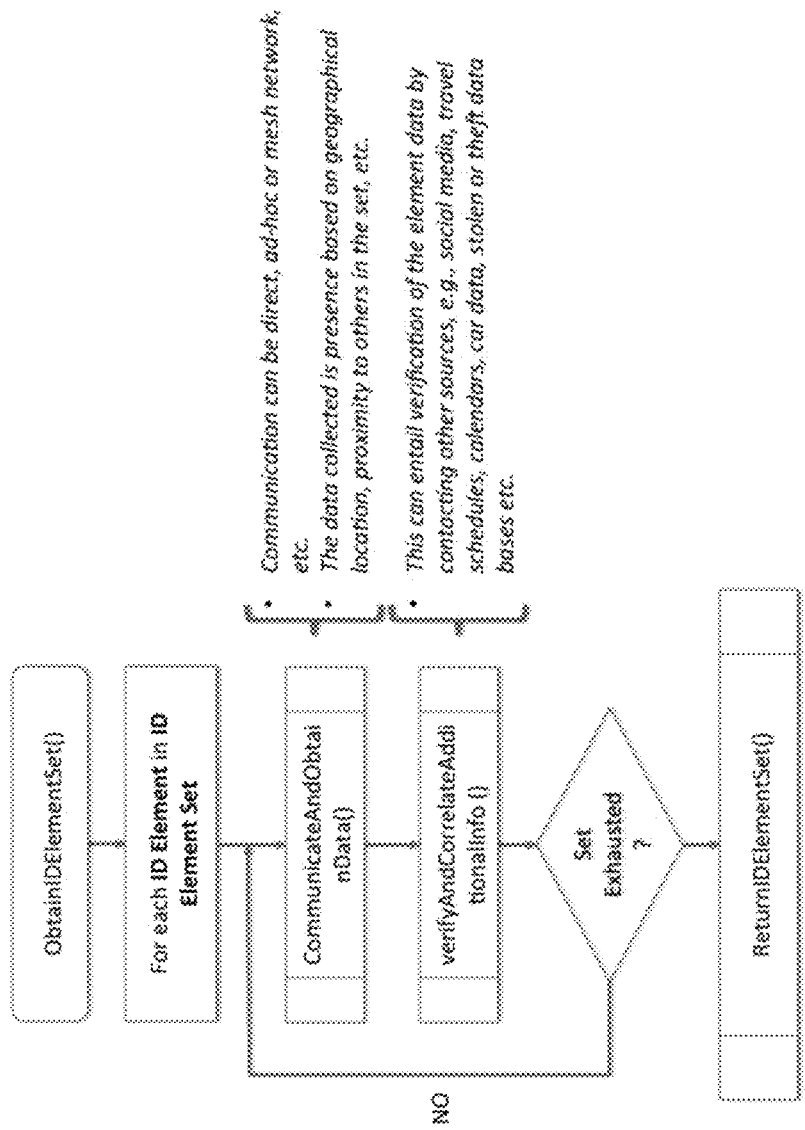
FIG. 9 illustrates the gathering of the ID element set associated with the user, which includes identity elements that are pre-approved and/or non-certificated elements, such as additional data sources; in accordance with one non-limiting aspect of the present invention.
Figure 10:
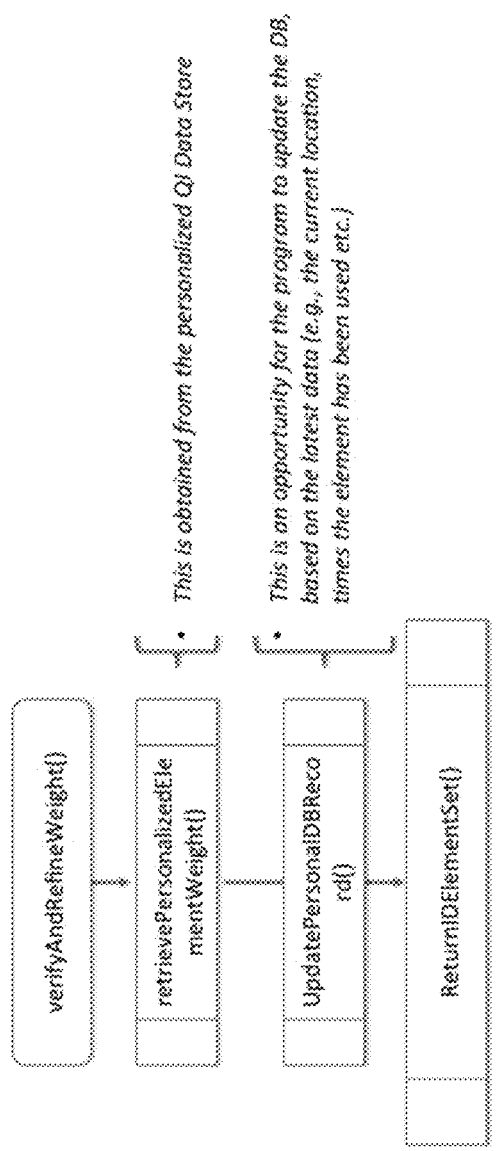
FIG. 10 illustrates generating weighted values and dynamically changing weight values as users attempt identification in accordance with one non-limiting aspect of the present invention.

To be a provider of QI, multiple elements are required. A subset of these are presented in FIG. 6.

1. QI Establisher

This establishes the ID elements that are associated with a user, and whether they are acceptable or not for QI calculation. It does this by ensuring that there is a way to communicate and authenticate these elements; for instance, by communicating with the device provider, or the provider of the service(s) provided by the device. It then establishes and maintains the weight data: both general and personal. For instance, if an ID element is reported misplaced or stolen, it may update the personal QI data store. If a certain ID element is susceptible to compromised credentials, then it may reduce its weight in the QI Data Calculation Tables. ID elements can be added, removed or modified at run-time, and this element can re-verify its use when such events occur.

2. QI Data Calculation Tables

These are the generic calculation weights that are determined by the QIP, for each element. These may be added, modified, or deleted over time via the QI establisher, or other elements within the QIP. See FIG. 7 for an example. This will allow onboarding of new users, for broadly impacting actions (e.g., compromised device credentials) and similar uses.

FIG. 7 provides a sample data calculation table. As shown, this considers a handful of elements that can be used for QI calculation, when they form an ID Element Set. This is when a Primary ID Element can communicate with the QIP, and the rest of the elements can communicate with each other via direct communication to the primary, or via peer-connections. The weights shown are examples, and each QIP is anticipated to choose values that they deem appropriate.

The table provides values for authentication and verification, location, and proximity categories. The values can be additive, neutral, or subtractive. The positive values are when the elements are as expected. For instance, they are authenticated, in a location that is expected (e.g., based on accessible schedules, social media, or data analytics based on habits) and all the elements in the Identity Element Set are in near proximity (based on wireless connection strength, or similar mechanisms). Neutral values are used when an element is incapable of providing the expected designation (e.g., a smart pedometer may not have a GPS for location).

If an element that is part of a set is removed or flagged (e.g., because it was stolen, replaced, etc.) then they can be "unexpected", if there is an attempt to have them behave as though they were part of the ID Element Set. For instance, someone steals multiple items that have been flagged and attempts impersonation. Negative values can also be used when there is a mismatch in expectations. For example, if the person is anticipated to be Location X according to their travel schedule, and their cellphone GPS shows Y. Proximity is used to help prevent, or mitigate, cases where someone attempts to take advantage of closeness to a person. For example, one could steal one element (e.g., cell phone) and try to impersonate the owner by being close to their home where they know the other elements are likely to be.

3. Personalized QI Data Store

This is a refinement of the QI data calculation tables, on a per user basis. This will employ learning algorithms to refine weights based (e.g., based on usage patterns) at the individual or group level. For instance, if the user is found to carry the same set of ID elements most of the time, then this combination may be provided a better weight rating for refinement or a requirement to have this data set for a greater value.

4. ID Element Communicator

This communicates with the ID elements. It may try to designate one of the ID elements as the Primary Element, e.g., based on the QI data calculation table, or others (e.g., communication medium, security etc.). This primary element may become the conduit for other elements. Alternatively, the ID element communicator may just speak to different elements independently. When one is designation the primary, then this can help communicate with the rest, e.g., via local mesh or ad-hoc networks. For example, if the primary ID element is a cell phone then it can communicate with a car, smart pedometer, and keys via Bluetooth. Mechanisms to secure such connections (e.g., via shared credentials, X.509) are either provided by the QIP, by the respective service providers, or a combination.

5. Additional Data Processor

This element captures additional data about a user via interfaces to data sources outside of the ID elements. For instance, social media usage patterns, travel schedules, events etc. The data collected is used to raise "red flags" or refine the weights.

6. QI Calculator

This is the element that makes the final call on the QI calculations, e.g., the translator may add up each of the weighted values depending on the associated conditions in categories listed in the data calculation table. This is based on all of the weights, with any refinements and corrections. The quantified identity may correspond with a summation of the weight values relative to a threshold such that a total exceeding the threshold may indicate the user is who they say they are and a total less than the threshold may indicate the user is posing as someone else.

Any number of factors may be considered when determining the threshold or otherwise authenticating the user. Depending on availability of the identity elements and/or that additional data sources, the threshold may be increased or decreased, e.g., the threshold may be higher when less sources are available than when more element/sources are available.

One non-limiting aspect of the present invention proposes a mechanism to create a "Quantified User Identity" that capitalizes on the proliferation of personal devices and ubiquitous communication for personalization, authentication, authorization, secure communications, etc. Given the ever-increasing computing power, the present invention contemplates moving on from single-factor authentication (e.g., "what you know", such as a password) to multi-factor authentication (e.g., "what you know AND have", password+RSA Key). With the increasing number of devices that one is starting to carry (e.g., personal health care devices such as the Fitbit, or your smart car keys) this is now becoming multi-dimensional (e.g., "what all do you have?"). This invention proposes: use of multi-dimensional aspects to create a probabilistic identity profile that is quantified in conjunction with time, location, and proximity and/or to enable users to move away from a user-entry system (such as a password or credit card) to logical identification.

Here are a couple of use cases:

Easier Shopping: A person walks into a grocery store, picks up whatever (s)he wants to purchase, and walks out. No need for explicit authentication or checkout, i.e., no credit card, mobile or verbal payments.

Easier Access: A person turns on the TV in a hotel room and is automatically able to access his/her content without having to choose or select.

One non-limiting aspect of the present invention contemplates using a central identity provider, sensors, and probabilistic security, such as a "Quantified Identity Provider (QIP)" (e.g., NetworkFX) provides a user with a digital identity, such as an X.509 certificate. This certificate uniquely identifies the user (e.g., via an SSN, which could be encrypted for privacy). This can then be associated with any number of cable devices (e.g., STBs, cable modems, phones) and non-cable devices (e.g., mobile phones, cars, sensors) etc. It can also be associated with modes of payment (e.g., credit cards, cable account). The "Identity Provider" can then communicate with the associated devices, and share authorization tokens. This allows them to authenticate each other, or securely identify their association to an external entity. This association is then re-verified in the background in response to a request from an identity requestor by querying the QIP, thereby establishing a "Quantified Identity".

One use case may utilize three things a user may carry on their person: car keys, mobile phone, and personal health monitor (e.g., Fitbit). Assuming that there are no causes for concern, and the QIP can authenticate each of them as belonging to a particular user, the QIP or identity requestor can make a reasonable assumption that "a person" who has all three is as they say they are and not someone posing as that person. These three identity elements, and any additional identity elements or additional data sources, can communicate with each other, or with an external entity (e.g., a department or grocery store's payment system). If they are securely associated by a QIP, who verifies their associations to the user, then the identity requestor can obtain a probabilistic verification of my identity. The more associations you can verify, the stronger the identity. In this particular example, here are some events that could affect this, but can be recognized and flagged:

Car is notified that it has been stolen or the navigation system is disabled (indicating potential theft), which it relays to the car key (no communication implies it cannot authenticate).

Fitbit (or the App) recognizes an unusual gait pattern.

Mobile phone has not been connected to the network for a long time, or is not in an expected area.

For those concerned, reliable authentication based on physical devices that a person typically carries may be better than a username and a weak password, or a stolen credit card number. As the proliferation of devices increases—so will the precision of authentication contemplated by the present invention. Other factors that are going to make this even more precise are, as examples:

Personal (on-body or ingestible) or in-car sensors that can identify you based on biological characteristics (heart rhythm).

Big data analytics that can enhance or question your presence.

The use of a QIP, and a "user identity" allows for the associations to be changed dynamically, allowing for the user identity to adapt to changing devices and circumstances (e.g., when you move from one cable provider to another).

The user can explicitly associate devices with themselves, or the connection happens automatically in the background:

For cable customers, this can be made when someone signs up using G2B.

Non-cable customers, say Fitbit (personal activity tracker), can establish a relationship with NetworkFX.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for determining a quantified identity for a device comprising:

receiving a quantified identity (QI) request from an identity requester, the QI request indicating an identity determined by the identity requester as being associated with the device proximate in time to issuance of the QI request;

determining a certificate uniquely associated with the identity;

identifying a predetermined set of identity elements associated with the identity, the predetermined set of identity elements each having been previously provided the certificate;

determining from a calculation table or a calculation algorithm a plurality of weight values to represent whether the predetermined set of identity elements are operating in a manner consistent with how the device associated with the identity would interact with the predetermined set of identity elements proximate in time to receipt of the QI request;

determining a quantified identity for the device as a function of the plurality of weight values, the quantified identity indicating whether the identity associated with the QI request is likely to be that of the device or another device posing as the device; and determining a location of the device proximate in time to receipt of the QI request, including increasing one or more of the plurality of weight values used in determining the quantified identity if the location is within a wireless range of the identity requester and decreasing one or more of the plurality of weighted values used in determining the quantified identity if the location is beyond the wireless range of the identity requester.

2. The method of claim 1 further comprising adjusting from previously determined values one or more of the plurality of weight values used in determining the quantified identity as a function of data generated from one or more additional data sources, the additional data sources operating independently of the predetermined set of identity elements.

3. The method of claim 2 further comprising determining from one or more of the additional data sources the location of the device proximate in time to receipt of the QI request.

4. The method of claim 1 further comprising indicating the identity to be that of the device when a summation of the plurality of weight values is greater than a threshold and to be that of another device posing as the device if the summation is less than the threshold.

5. The method of claim 4 further comprising varying the threshold in proportion to a quantity of the predetermined set of identity elements such that the threshold is greater when the quantity is larger and lower when the quantity is smaller.

6. The method of claim 4 further comprising representing each of the plurality of weight values with one of a positive value, a negative value and a neutral value.

7. The method of claim 6 further comprising determining for each corresponding one of the predetermined set of identity elements the positive value when operating in accordance with an expected designation, the negative value when operating mismatched with the expected designation, and the neutral value when incapable of operating in accordance with the expected designation.

8. The method of claim 1 further comprising determining the predefined set of identity elements from a greater predefined set of identity elements, the predefined set of identity elements being a portion of the greater predefined set of identity elements wirelessly interacting with the device.

9. The method of claim 8 further comprising excluding from the predefined set of identity elements each of the greater predefined set of identity elements failing to wirelessly interact with the device.

10. The method of claim 1 further comprising representing the quantified identity with a numerical value such that a greater numerical value indicates a greater probability that the device is properly associated with the identity.

11. The method of claim 9 further comprising adjusting the numerical value representing, and thereby the quantified identity, subsequently to initially determining the quantified identity in response to operation of the predetermined set of identity elements changing over time thereafter.

12. The method of claim 1 further comprising limiting the identity elements used for determining the plurality of weight values to the identity elements determined to be in proximity to the identity requester proximate in time to receipt of the QI request such that at least a portion of the identity elements are not used for determining the plurality of weight values.

13. The method of claim 12 further comprising determining the predetermined set of identity elements to be in proximity to the identity requester in the event the corresponding identity element is capable of wirelessly communicating directly with the identity requester or with another one of the predetermined set of identity elements capable of wirelessly communicating directly with the identity requester.

14. A for determining a quantified identity for a device comprising:
 determining a request from an identity requester desiring to assess whether the device is properly associated with an identity, the request indicating the identity as determined by the identity requester for the device;
 identifying a plurality of identity elements previously associated with the identity;
 determining a first plurality of values to represent how the plurality of identity elements are interacting with the device at a first time occurring proximate in time to receipt of the QI request;
 determining a first quantified identity for the device as a function of the first plurality of values, the first quantified identity indicating a first probability of whether the device is properly associated with the identity; and
 determining a second plurality of values to represent how the plurality of identity elements are interacting with the device at a second time occurring after the first time; and
 determining a second quantified identity for the device as a function of the second plurality of values, the second quantified identity indicating a second probability of whether the device is properly associated with the identity.

15. The method of claim 14 further comprising limiting the first and second plurality of values to corresponding ones of the plurality of identity elements wireless interacting with the device at corresponding ones of the first and second times.

16. The method of claim 14 further comprising:
 determining the first and second plurality of values from a table having numerical values defined prior to receipt of the request;
 determining a location of the device at the first and second times;
 increasing one or more of the numerical values in the table used in determining the first quantified identity if the location is within a wireless range of the identity requester at the first time and decreasing one or more of the numerical values in the table used in determining the first quantified identity if the location is beyond the wireless range of the identity requester; and
 increasing one or more of the numerical values in the table used in determining the second quantified identity if the location is within the wireless range of the identity requester at the second time and decreasing one or more of the numerical values in the table used in determining the second quantified identity if the location is beyond the wireless range of the identity requester.

17. The method of claim 14 further comprising:
 determining the first and second plurality of values from a table having numerical values defined prior to receipt of the request;
 indicating the first quantified identity with a high probability that the device is properly associated with the identity when a summation of the first plurality of weight values is greater than a threshold; and
 indicating the first quantified identity with a low probability that the device is properly associated with the identity when the summation of the first plurality of weight values is less than the threshold.

18. The method of claim 17 further comprising:
 determining each of the numerical values in the table to be a positive number; and
 adjusting the positive numbers in the table for each of the first plurality of weight values to be one of a positive value, a negative value and a neutral value depending on how the corresponding identity element is interacting with the device at the first time, including adjusting to the positive value when operating in accordance with an expected designation, to the negative value when operating mismatched with the expected designation, and to the neutral value when incapable of operating in accordance with the expected designation.

19. The method of claim 14 further comprising transmitting the first quantified identity to the identity requester in a first message and the second quantified identity to the identity requester in a second message, the second message being sent prior to the identity requester issuing another request to assess whether the device is properly associated with the identity at the second time.

20. A non-transitory computer-readable medium having a plurality of instructions executable with a processor to facilitate determining a quantified identity for a device, the plurality of instructions being sufficient for:

receiving a quantified identity (QI) request from an identity requester, the QI request indicating an identity determined by the identity requester as being associated with the device;

identifying a predetermined set of identity elements associated with the identity;

determining from a calculation table or a calculation algorithm a plurality of values to represent whether the predetermined set of identity elements are operating in a manner consistent with how the device associated with the identity would interact with the predetermined set of identity elements;

determining a quantified identity for the device as a function of the plurality of values, the quantified identity indicating whether the identity associated with the QI request is likely to be that of the device or another device posing as the device; and determining a location of the device proximate, including increasing one or more of the plurality of values used in determining the quantified identity if the location is within a wireless range of the identity requester and decreasing one or more of the plurality of values used in determining the quantified identity if the location is beyond the wireless range of the identity requester.

* * * * *